United States Patent [19]

Anderson et al.

[11] 4,340,407

[45] Jul. 20, 1982

[54] METHOD OF FORMING CAVITATED OBJECTS OF CONTROLLED DIMENSION

[75] Inventors: Paul R. Anderson, Toledo, Ohio; Wayne J. Miller, Ann Arbor, Mich.

[73] Assignee: The United States of America as represented by the United States Department of Energy, Washington, D.C.

[21] Appl. No.: 233,341

[22] Filed: Feb. 11, 1981

[51] Int. Cl.$^3$ .............................................. C03B 19/10
[52] U.S. Cl. ........................................ 65/21.4; 65/22; 264/15; 264/54
[58] Field of Search ...................... 65/21.4, 22; 264/15, 264/43, 54

[56] References Cited

U.S. PATENT DOCUMENTS

| | | | |
|---|---|---|---|
| 2,797,201 | 6/1957 | Veateh et al. | 260/2.5 |
| 3,292,114 | 12/1966 | Kenaga et al. | 162/168 |
| 3,488,714 | 1/1970 | Walters et al. | 161/161 |
| 3,821,128 | 6/1974 | Garner et al. | 260/2.5 B |
| 3,838,998 | 10/1974 | Matthews et al. | 65/21.4 |
| 4,003,858 | 1/1977 | Biglione et al. | 260/2.5 HB |
| 4,017,290 | 4/1977 | Budrick et al. | 65/21.4 |
| 4,021,253 | 5/1977 | Budrick et al. | 106/53 |
| 4,059,423 | 11/1977 | De Vos et al. | 65/21.4 |
| 4,133,854 | 1/1979 | Hendricks | 264/10 |
| 4,191,803 | 3/1980 | Katoh | 428/407 |

OTHER PUBLICATIONS

Development of Glasses for Application as Laser Fusion Targets Sandia Laboratories, Albuqurque, NM, Shelby 1/1977.

Primary Examiner—Robert L. Lindsay, Jr.
Attorney, Agent, or Firm—John A. Koch; Richard G. Besha; James E. Denny

[57] ABSTRACT

A method of controllably varying the dimensions of cavitated objects such as hollow spherical shells wherein a precursor shell is heated to a temperature above the shell softening temperature in an ambient atmosphere wherein the ratio of gases which are permeable through the shell wall at that temperature to gases which are impermeable through the shell wall is substantially greater than the corresponding ratio for gases contained within the precursor shell. As the shell expands, the partial pressures of permeable gases internally and externally of the shell approach and achieve equilibrium, so that the final shell size depends solely upon the difference in impermeable gas partial pressures and shell surface tension.

9 Claims, 13 Drawing Figures

METHOD OF FORMING CAVITATED OBJECTS OF CONTROLLED DIMENSION

The present invention is directed to manufacture of closed cellular objects such as foams or minute hollow spherical shells, termed microspheres in the art and in the present application. In particular, the invention relates to expansion of cellular plasticizable objects of the type having one or more closed internal cavities containing a volatile blowing agent. A specific application of the invention involves controlling dimensional parameters, i.e. diameter and wall thickness, of glass or plastic microspheres through selective control of pressure and composition of the forming atmosphere.

BACKGROUND OF THE INVENTION

Numerous techniques have been proposed for manufacture of microspheres of plasticizable material such as glass and polymers. The disclosures of the U.S. Pat. Nos. to Budrick et al 4,017,290 and 4,021,253, and to Hendricks 4,133,854 are exemplary. For glass microspheres, a dried gel powder or frit with an occluded blowing agent may be dropped through a tower furnace to form a microsphere having internally trapped residual gases or liquid. Similarly, it has been proposed as in Veatch et al U.S. Pat. No. 2,797,201 that polymeric shells may be formed by dissolving a film forming polymer in a suitable volatile solvent and then spraying the solution into the upper portion of a heated chamber.

In order to achieve greater shell size during the blowing or forming operation, it has been proposed as in the above-noted Hendricks patent to "pull a vacuum" or substantially reduce the ambient pressure in the heated volume of the chamber or furnace. However, furnace size, sometimes on the order of four meters or more, renders such an operation difficult to accomplish and control in practice, and makes unreliable efforts to control the dimensional parameters of the ultimate shells. Similar problems inhere to a greater or lesser extent in other types of operations for blowing glass or polymeric shells at elevated temperature in appreciable quantities.

OBJECTS AND SUMMARY OF THE INVENTION

A general object of the present invention is to provide an improved process for manufacture of cellular plasticizable objects of the type described, particularly glass or plastic microspheres, in which final size, i.e. diameter and wall thickness, may be closely controlled, and in which the final size may be increased as compared with the results of prior art techniques without any requirement for reduced pressure or "vacuum" in the forming atmosphere.

The foregoing and other objects are achieved in accordance with the invention as applied specifically to microshells by heating the shells to a selected temperature above the shell softening temperature within a gaseous ambience in which the ratio of gases which are permeable through the shell wall to gases which are impermeable through the shell wall at that selected temperature is significantly higher than the ratio of permeable to impermeable gases contained within the shell. During the ensuing shell expansion process, the partial pressure of permeable gas equalizes inside and outside of the shell by migration through the shell wall, so that final shell size and expansion ratio depends solely on the difference in impermeable gas partial pressure across the shell wall and a factor related to surface tension. Indeed, and in accordance with an important advantage of the invention, expansion of a shell initially having contained gases consisting entirely of impermeable gases in an ambience consisting entirely of permeable gases is equivalent to shell expansion in a perfect vacuum. As will be demonstrated, the same process may be applied to other cellular objects such as foams.

In particular, the present invention as applied to formation of microspheres contemplates first the selection or formation of a precursor shell enclosing a quantity of contained matter, at least a portion of which is volatilized and impermeable as a gas with respect to the shell wall at a temperature above the softening temperature of the shell material. Such a shell may comprise one that is performed in accordance with the above-referenced Budrick et al patents in the case of glass shells, for example, or in accordance with the Veatch et al patent in the case of polymers. Alternatively, the selected precursor shells may comprise a "shell" at an intermediate stage in the initial process of formation at which all chemical reactions of the shell material involved in the process of formation have been completed. That is to say that the method of the invention may be applied to preformed shells having contained therein a liquid or gaseous material which forms an impermeable gas above the shell softening temperature, and also may be applied during the initial shell forming process. In accordance with an important advantage of the invention to be described hereinafter, the invention may be utilized during initial shell formation and again in a repass operation on shells so preformed for enhanced shell expansion.

Following selection of a precursor shell as above described, the next step in the method of the invention contemplates heating of the precursor shell to a selected temperature above the shell softening temperature in an ambient gaseous atmosphere, at least a portion of which is permeable through the shell wall at the selected temperature, and in which the ratio of permeable to impermeable gas is different from that contained within the shell. The shell is thereby reformed by equalization of the shell internal and external partial pressures and by variation in shell size as a function of impermeable gas partial pressures. Where the partial pressure of impermeable gas within the precursor shell is significantly greater than that externally of the shell, the shell diameter expands. The ambient forming atmosphere may contain a number of gases which are permeable at the selected temperature, but some of which are impermeable at a second lower temperature above the softening temperature. If the shell is then heated in a repass operation to the second temperature in an atmosphere at least a portion of which is permeable at the second temperature, further expansion takes place.

DETAILED DESCRIPTION OF THE PREFERRED EMBODIMENTS

Figure 1:
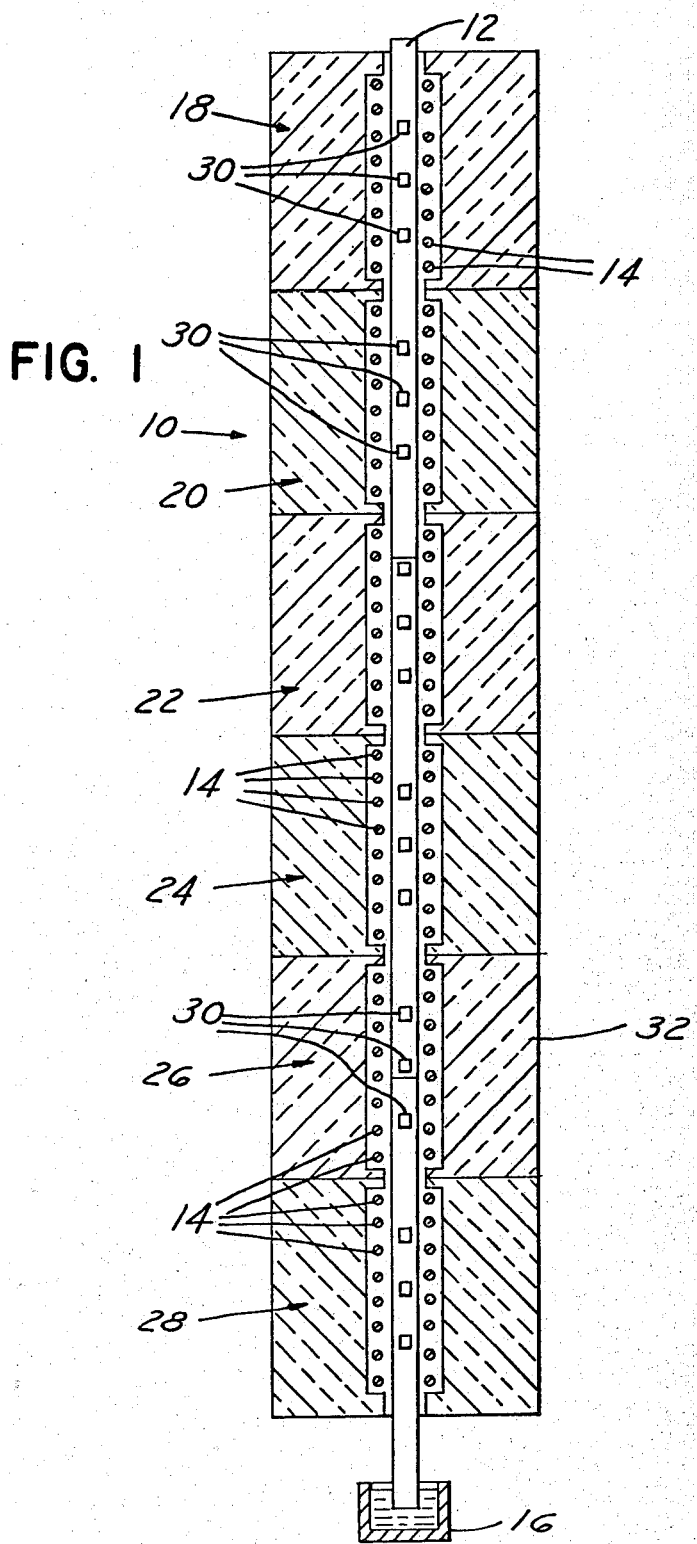
FIG. 1 is a semi-schematic elevational view of an oven or tower furnace for forming microspheres, particularly glass microspheres, in accordance with the invention and is not to scale.

As is well known, permeability of gases through material depends upon a number of factors including material composition, thickness, temperature and time of exposure at the particular temperature. For purposes of the present application, the terms "permeable" and "impermeable" for any particular gas are defined by application of Fick's law in the following equation derived as a model for a spherical shell having non-expansible walls:

$$\frac{P - P_2}{P_o - P_2} = \exp\frac{(-KARTt)}{LV} \qquad (1)$$

where
- T = absolute temperature
- t = time of exposure at temperature T
- R = a gas constant
- K = permeability of material at temperature T
- A = area exposed to permeation
- L = thickness of material
- V = volume within shell
- $P_2$ = ambient pressure of the gas at temperature T externally of the shell
- $P_o$ = initial interior gas pressure at temperature T
- P = interior pressure after time t.

In application of the present invention, the following time and temperature constraint applies: the shell must be exposed to a constant temperature T for a time t sufficiently long that, for a permeable gas, pressure P is substantially equal to pressure $P_2$. For purposes of the present application, a permeable gas is defined as one wherein the expression $$\exp\frac{(-KARTt)}{LV} \qquad (2)$$

is equal to or less than 0.2. An impermeable gas is defined as one wherein the value of expression (2) is equal to or greater than 0.8. Note that a particular gas may be permeable at one temperature but impermeable at a lower temperature for the same shell. Each of the parameters in expression (2) may be readily determined experimentally for any particular gas, shell size and shell material. It will also be recognized that expressions (1) and (2) do not illustrate the dynamics of shell expansion, but are used solely for the purpose of defining "permeable" and "impermeable".

Limitations on temperature T in application of the invention depend upon the shell composition and gases involved. The upper temperature limit for polymeric shells, for example, is usually one at which the polymer decomposes, while for glass the upper temperature limit is one at which the shell-contained impermeable gas required for expansion becomes permeable. The lower temperature limit is determined by the shell softening temperature and the requirement that at least a portion of the ambient gas (outside of the shell) must be permeable through the softened shell wall.

The mechanism of operation of the invention may be appreciated with reference to the following model. For purposes of this discussion, shell wall thickness is assumed to be small as compared with shell radius so that either inner or outer radius may be used without appreciable error. Shell walls are assumed to be fluid or expansible throughout the expansion process. Gases are assumed to be either totally permeable (expression (1) equals zero) or totally impermeable (expression (1) equals unity). $R_1$ is initial radius and $R_2$ is final radius. The gas inside the shell initially consists of an impermeable portion at partial pressure $P_{a1}$ and a permeable portion at partial pressure $P_{b1}$. The ambient atmosphere includes an impermeable gas component at partial pressure $P_{a0}$ and a permeable component at partial pressure $P_{b0}$. Since totally impermeable gases by definition neither enter nor leave the shell, the partial pressure of impermeable gas within the shell at equilibrium (i.e., with time t and temperature T constraints as previously noted) is given by the equation:

$$P_{a2} = P_{a1}\frac{R_1^3}{R_2^3} \qquad (3)$$

Since the pressure of totally permeable gas will equalize internally and externally of the shell, the final partial pressure of permeable gas within the shell is given by:

$$P_{b2} = P_{b0} \qquad (4)$$

The total pressure within the shell at equilibrium will be related to the total or ambient pressure outside the shell by the equation:

$$P_{a2} + P_{b2} = P_{a0} + P_{b0} + (4k)/(R_2) \qquad (5)$$

where k is surface tension of the shell material. Substitution of equations (3) and (4) into (5) gives:

$$P_{a0}R_2^3 + 4kR_2^2 = P_{a1}R_1^3 \qquad (6)$$

Note that final radius $R_2$ is unrelated to permeable gas pressure. Thus, in practicing the invention, the entire atmosphere within the heated chamber or furnace may be replaced by an atmosphere of controlled permeable and impermeable composition. In particular, the ambient atmosphere may consist of permeable gas at or slightly above one atmosphere pressure. Maintaining such an atmosphere within the heated chamber may be accomplished much more readily than any attempted reduction of furnace pressure to vacuum conditions as in the prior art. Additionally, presence of atmosphere enhances heat transfer by conduction to the falling particles. Furthermore, under conditions wherein the ambience consists of permeable gas such that $P_{a0}$ is equal to zero, final radius $R_2$ will depend solely upon starting radius $R_1$, surface tension k and starting impermeable gas partial pressure $P_{a1}$.

A number of shells of silica glass composition have been formed from dried gel under varying conditions to demonstrate the invention. Gel preparation was as follows. Gel Method I: Alkaline metals and calcium were combined in ethanol under argon, with the amount of ethanol being sufficient to dissolve the alkali metals. The quantities of metals depended upon the desired concentrations of each in the resulting frit. 2-4 pentanedione was added to prevent precipitation. Tetraethoxysilane in an amount sufficient to yield the desired frit silica concentration was then added after the metals were fully dissolved. A mixture of 50% ethanol and 50% water (by volume) was then added dropwise to the solution until the result approached gel viscosity. Triethoxyborane was then added in an amount calculated to yield a desired boron concentration in the frit and the solution was allowed to gel. The gel was heated to 55°

C. and held for several hours (overnight), and then vacuum dried at 100° C. The gel was then crushed and sieved to yield a gel powder or frit of desired particle size. Gel Method II was the same as Gel Method I but with the calcium and pentanedione deleted.

Glass precursor microspheres were formed from the above frit by dropping the frit particles into a tower furnace of the type illustrated in FIG. 1. The furnace 10 of FIG. 1 is similar to that shown in the above-identified Budrick et al U.S. Pat. No. 4,017,290 and comprises a vertical three-section ceramic pipe 12 having a 7.6 cm diameter and an overall height of 3.9 meters. Pipe 12 is heated uniformly by ninety-six silicon carbide heating elements 14. Furnace 10 is divided into six separately controlled and monitored sections 18–28 each having three thermocouples 30 connected to suitable temperature control and recording circuitry (not shown). The overall furnace is encased in a layer of high temperature insulation 32. The lower end of pipe 12 is illustrated as being submerged in a container 16 of distilled water which serves to seal the bottom of tube 12. Gel powder frit is fed into the furnace tube at the top either manually, as by a spatula, or by a motorized powder feeder. The frit and resultant shells fall by gravity through the furnace atmosphere and are collected. The composition of the furnace ambient atmosphere is controlled by means not shown.

Figure 2:
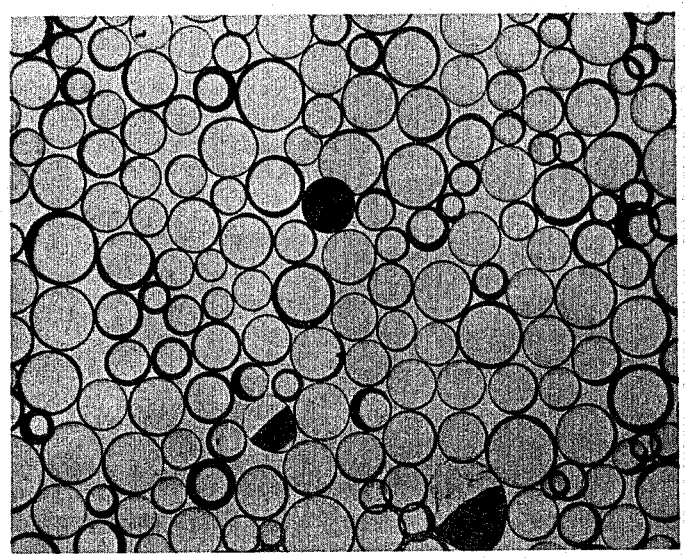
FIGS. 2-11 are photomicrographs of glass microspheres fabricated to demonstrate the principles of the invention, FIGS. 2-5 and 8-11 being at 39X and FIGS. 6-7 being at 24X.
Figure 3:
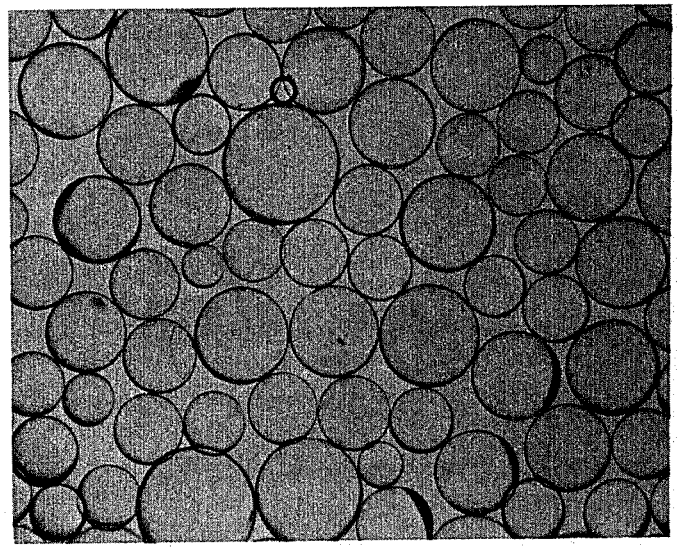

In a first run using a dried silica glass gel prepared by Gel Method I at a sieve cut of 106–125 $\mu$m, the ambient atmosphere within the tower was air, which is considered to be substantially impermeable, at atmospheric pressure. Container 16 was removed and the furnace temperature set at 1500° C. throughout its length. Previous experimentation had demonstrated that the furnace height was more than sufficient to permit shells falling by gravity to reach equilibrium as previously described. Upon dropping the gel particles through the furnace, shells as shown in FIG. 2 having an average outside diameter of 205 $\mu$m and an average wall thickness of 4.7 $\mu$m resulted. In a second run using the same gel frit and sieve cut, container 16 was placed as shown in the drawing and the water therein brought to a boil so that a substantial portion of the tower was filled with water vapor. The partial pressure of water vapor was calculated to be 0.7 atm, the remainder being air and the total pressure being one atmosphere. Water vapor is permeable to silica glass shells under the equilibrium conditions described. With conditions otherwise as previously stated, shells as shown in FIG. 3 having an average outside diameter of 322 $\mu$m and an average wall thickness of 2.0 $\mu$m resulted. Thus, replacement of a portion (70%) of the impermeable ambience (air) with a permeable gas (water vapor) in accordance with the invention resulted in an increase in shell expansion by a factor of about 1.5.

Figure 8:
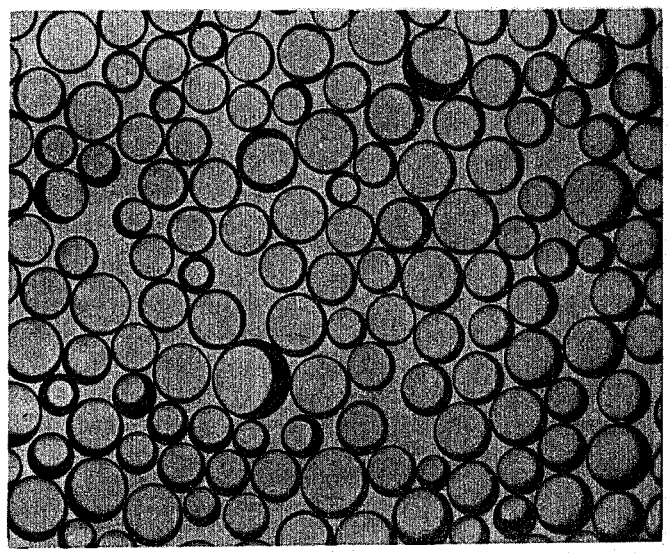
Figure 9:
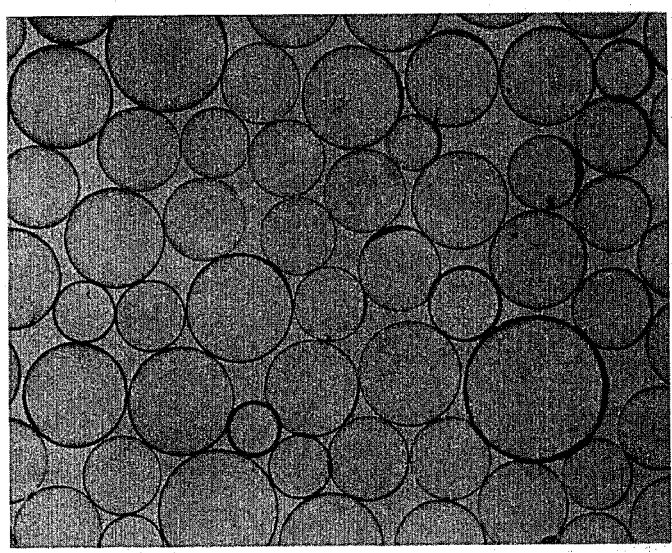

Using a different gel prepared in accordance with Gel Method I sieve cut to 125–150 $\mu$m and conditions otherwise as previously described, shells collected dry (FIG. 8) had an average outside diameter of 227 $\mu$m and an average wall thickness of 5.8 $\mu$m, while shells collected in boiling water (FIG. 9) had an average outside diameter of 373 $\mu$m and an average wall thickness of 2.7 $\mu$m. Again, presence of water vapor resulted in a substantial increase in shell expansion.

Figure 4:
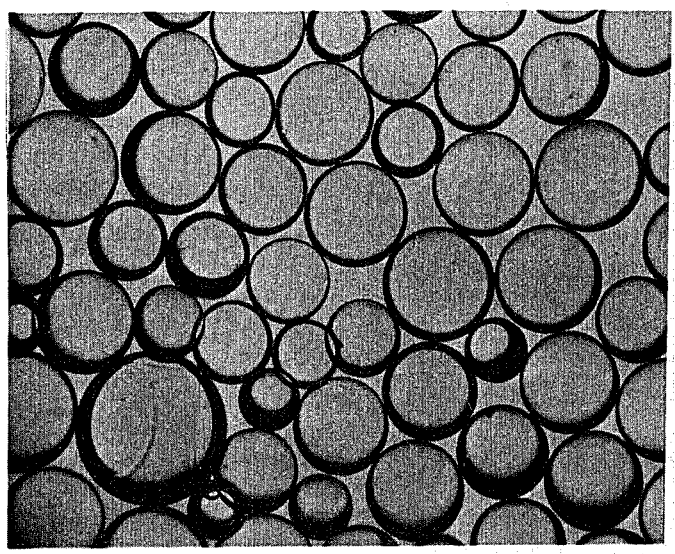
Figure 5:
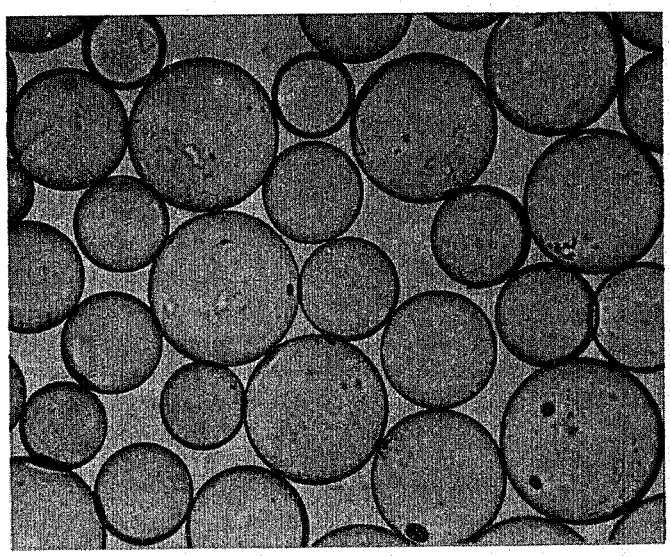
Figure 6:
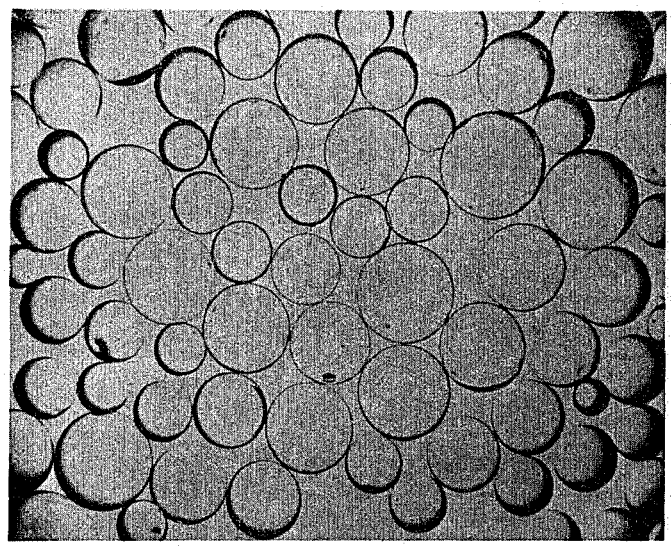
Figure 7:
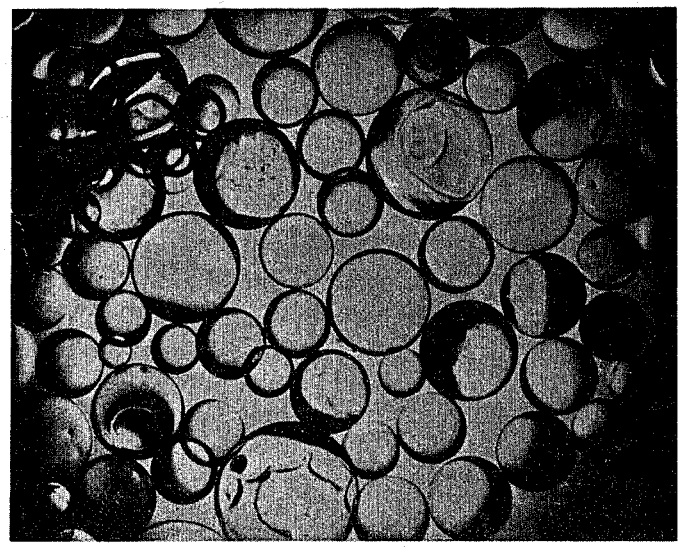

In another test using a different borosilicate dried gel frit prepared in accordance with Gel Method II at two differing starting sizes, and differing gases in furnace 10, the following results were noted: With furnace 10 at 1500° C., water in container 16 at room temperature and the furnace ambience consisting essentially of air (impermeable) at atmospheric pressure with only minimal water vapor from container 16, a frit at 212–250 $\mu$m sieve cut gave shells as shown in FIG. 4 having a 402 $\mu$m average outside diameter. Under the same conditions with the water in container 16 brought to a boil such that the atmosphere in furnace 10 was about 70% water vapor (permeable) and the remainder air (impermeable) at one atmosphere total pressure, the 212–250 $\mu$m sieve cut shells increased as shown in FIGS. 5 and 6 to an average outside diameter of 501 $\mu$m, while a 425–500 $\mu$m sieve cut gave a 728 $\mu$m average outside diameter. Finally, with container 16 removed and the furnace atmosphere consisting primarily of helium (permeable) in amount greater than 50% partial pressure and the remainder air at a total pressure of about one atmosphere, the 215–250 $\mu$m sieve cut gave shells as shown in FIG. 7 having a 541 $\mu$m average outside diameter, and the 425–500 $\mu$m sieve cut produced shells having a 959 $\mu$m average outside diameter.

Figure 10:
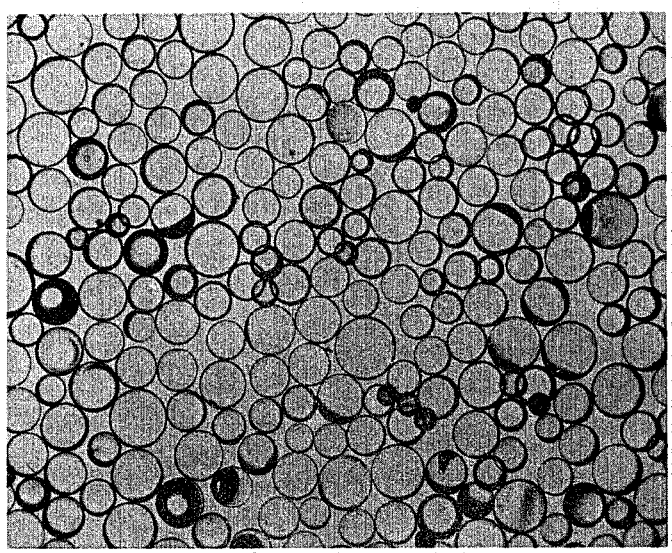
Figure 11:
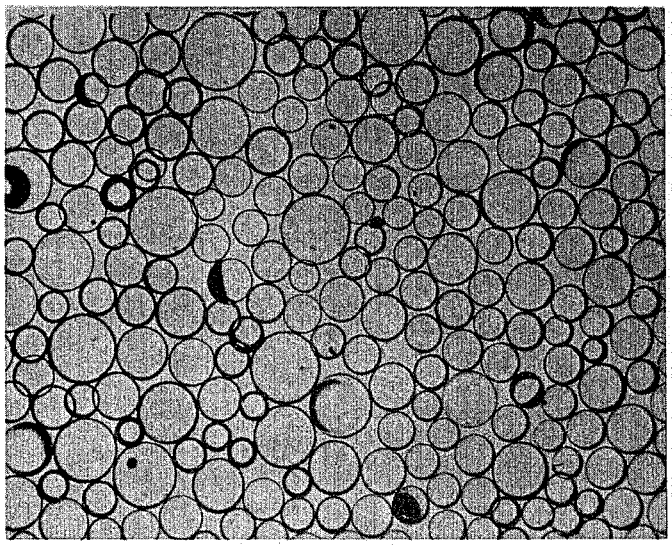

FIGS. 10 and 11 provide a qualitative comparison of the size of shells prepared from yet another frit sample, dropped through furnace 10 at 1150° C. and collected dry (FIG. 10) and in boiling water (FIG. 11). The quantitative relationship between the permeable/impermeable gas ratio and shell expansion is not known at the present time. It is believed that the use of water vapor as a permeable gas may affect shell size through dynamic phenomena in addition to the permeable nature of the vapor. For example, water vapor rising from container 16 (FIG. 1) suspends the shell particles within the furnace for a longer period of time. Additionally, water is known to decrease the viscosity of glass. On the other hand, presence of water vapor has been demonstrated to promote surface removal of alkali metals in the case of Gel Method II, which increases both silica concentration and viscosity. In any event, the foregoing examples are considered qualitatively to demonstrate the principles of the invention whereby replacement of at least a portion of the impermeable ambient atmosphere with a permeable gas yields a generally predictable increase in shell expansion.

Although the invention has been described in detail with examples as related to glass shells, and particularly silica glass shells, it will be apparent that the principles of the invention have equal application to formation of shells of a polymeric material otherwise employing techniques such as those described in the above-referenced Veatch et al patent. Similarly, for either glass or polymeric shells, the invention is not limited to particular temperatures, pressures or materials cited in the examples, but is intended to encompass other embodiments within the broad principles and limitations previously outlined.

It will also be appreciated that, although the invention has been described in connection with manufacture of individual glass or plastic microspheres, the principles of the invention apply equally as well to other closed cellular or cavitated structures such as aggregates and foams. Indeed, the invention may be applied to expansion of any cellular object having one or more closed cavities containing a volatile impermeable blowing agent, provided that the object may be rendered plastic or soft at a temperature at which the contained agent remains impermeable, and at which another gas in the forming atmosphere may permeate through the cell walls and reach equilibrium as previously described.

Figure 12:
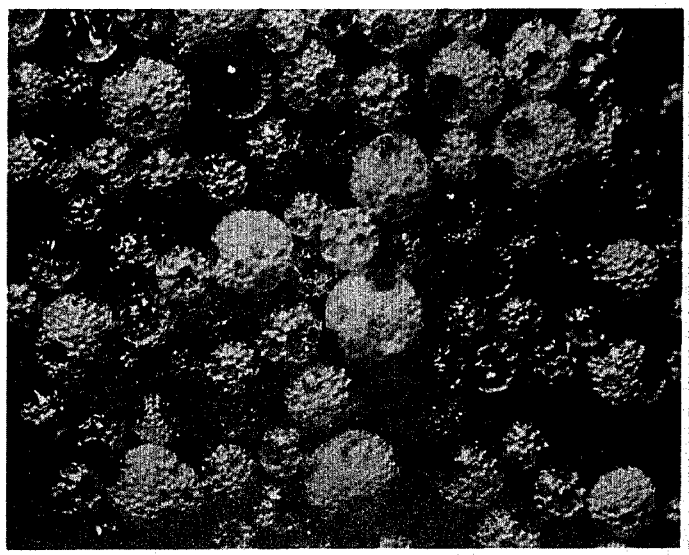
FIGS. 12 and 13 are photomicrographs at 39X of foamed glass particles fabricated to demonstrate the principles of the invention.
Figure 13:
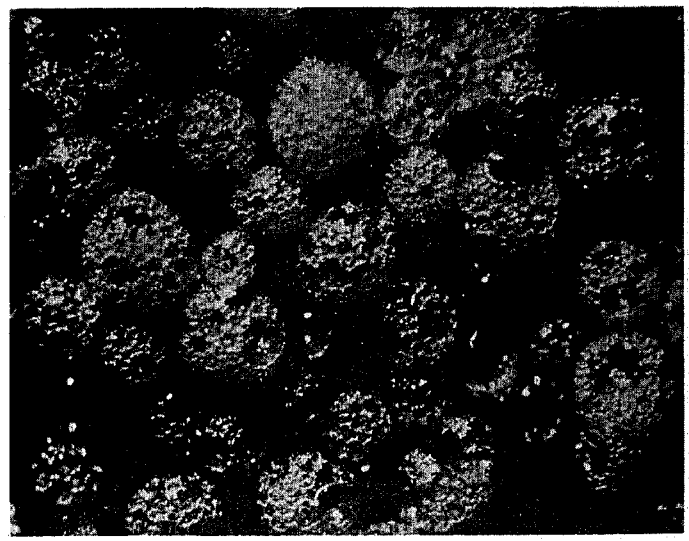

Application of the principles of the invention to foamed glass particles has been demonstrated as follows: Glass tubing consisting of twenty-five weight percent soda, fifteen weight percent alumina and sixty weight percent silica was crushed, ground and sieve cut to obtain particles of less than 45 μm size. Fifteen parts of such particles were then mixed with one part sodium carbonate, were added to distilled water, the water boiled off, and the mixture recrushed and ground to less than 45 μm size. Small batches of the resulting particles were then pressed into cylindrical precursor pellets having a 250 μm diameter and 125 μm height. The pellets were then dropped through the furnace of FIG. 1. FIG. 12 shows the resulting foamed glass particles as collected dry (container 16 removed), and FIG. 13 shows the resulting foamed particles with container 16 in place and the water brought to a boil. Comparing FIGS. 12 and 13, it will be apparent that the presence of water vapor (about 70% of one atmosphere total) resulted in foamed particles of increased size.

What is claimed is:

1. A method of controlling expansion of hollow cellular objects in a blowing operation comprising the steps of:
   (a) selecting a cellular plasticizable precursor having one or more closed internal cavities containing a volatile blowing agent, at least a portion of which is impermeable through the cavity walls of said precursor at a selected first temperature above the precursor softening temperature, and then
   (b) subjecting said precursor to said selected first temperature in an ambience of gas, at least a portion of which is permeable through the cavity walls of said precursor at said selected first temperature, for a time sufficient for equalization of the partial pressures of said permeable gas internally and externally of said precursor cavities,
   such that said precursor expands as a function of said partial pressures of said impermeable gas and independently of partial pressure of said permeable gas.

2. The method set forth in claim 1 wherein said ambience includes a first gas component which is permeable through said cavity walls at said selected first temperature but impermeable through said cavity walls at a second lower temperature above said softening temperature of said precursor, and a second gas component which is permeable through said cavity walls at both said first and said second temperatures, and wherein said method comprises the further step of:
   (c) subjecting said precursor following said step (b) to said second temperature for a time sufficient for equalization of the partial pressures of said second gas component internally and externally of said precursor,
   such that said precursor expands further in said step (c) as a function of said partial pressures of said first gas component and said impermeable gas and independently of partial pressures of said second gas component.

3. A method of altering dimensional parameters, such as diameter and wall thickness, of hollow spherical shells comprising the steps of:
   (a) selecting a hollow spherical precursor shell of first diameter enclosing a quantity of contained matter, at least a portion of which is volatilized and impermeable through the wall of said precursor shell at a selected first temperature above the shell softening temperature, and then
   (b) subjecting said shell to said selected first temperature in an ambience of gas, at least a portion of which is permeable through the wall of said precursor shell at said selected first temperature, for a time sufficient for equalization of the partial pressure of said permeable gas portion internally and externally of said shell,
   such that said shell assumes a second diameter as a function of said first diameter, the partial pressures of said impermeable gas internally and externally of said shell and surface tension of said shell, and independent of partial pressure of said permeable gas.

4. The method set forth in claim 3 wherein said precursor shell is constructed of material selected from the group consisting of polymers and glasses.

5. The method set forth in claim 3 wherein said precursor shell is of glass composition, and wherein said ambience includes helium.

6. The method set forth in claim 3 wherein said precursor shell is of glass composition, and wherein said ambience consists of air and water vapor.

7. The method set forth in claim 5 or 6 wherein said first temperature is substantially equal to 1500° C.

8. The method set forth in claim 3 wherein said ambience includes a first gas component which is permeable through said shell wall at said selected first temperature but impermeable through said shell wall at a second lower temperature above the softening temperature of said shell and a second gas component which is permeable through said shell wall at both said first and second temperatures, and wherein said method further comprises the step of:
   (c) subjecting said shell formed in said step (b) to said second temperature for a time sufficient for equalization of the partial pressure of said second gas component internally and externally of said shell.

9. The method set forth in claim 1, 2 or 3 wherein total pressure of said ambience is substantially equal to one atmosphere.

* * * * *